United States Patent

[11] 3,596,765

| [72] | Inventors | Leonel L. Beudin<br>74 Rue de la Federation;<br>Roger O. Cuvillier, 69, Rue Henri-<br>Barbrusse, 92 Nanterre, both of Paris 15,<br>France |
|---|---|---|
| [21] | Appl. No. | 873,767 |
| [22] | Filed | Oct. 31, 1969 |
| [45] | Patented | Aug. 3, 1971 |
| [32] | Priority | Nov. 10, 1966 |
| [33] | | France |
| [31] | | 83,311<br>Continuation-in-part of application Ser. No.<br>682,440, Nov. 13, 1967, now abandoned. |

[54] DENSITY SEPARATION APPARATUS
12 Claims, 20 Drawing Figs.

[52] U.S. Cl. .................................................. 209/456,
209/486, 209/494, 209/500

[51] Int. Cl. ................................................ B03b 3/22
[50] Field of Search ........................................ 209/455,
456, 457, 475, 476, 484, 486, 494, 504, 425, 426,
468, 469, 500

[56] References Cited
UNITED STATES PATENTS

| 794,555 | 7/1905 | Scovell .......................... | 209/425 |
| 2,138,810 | 11/1938 | Wood ............................ | 209/455 X |

*Primary Examiner*—Frank W. Lutter
*Assistant Examiner*—Ralph J. Hill
*Attorney*—Sughrue, Rothwell, Mion, Zinn & MacPeak

ABSTRACT: A density separation jig that combines vertical and horizontal liquid force components to separate the end product at the center of the grid. The frequency of the diaphragm is controlled to produce the horizontal force component and establish maximum separation. The grid can comprise various zones of mesh to take advantage of the horizontal separation. The discharge chute can be transparent and the jig components designed for easy portability.

DENSITY SEPARATION APPARATUS

CROSS-REFERENCE TO RELATED PATENTS

This invention is a continuation-in-part of an earlier filed application, Ser. No. 682,440, filed Nov. 13, 1967, now abandoned.

This invention relates to a density separation apparatus generally known as a "jig," and capable of extracting, from a crude heterogeneous product in a single operation, practically pure products of a dense nature.

Such apparatus uses the liquid displacement effect of a pistonlike action originating from the alternating motion of a submerged diaphragm.

While there are varied forms of such apparatus, most comprise a liquid tank having a submerged diaphragm.

The upper part of the tank includes a horizontal grid onto which the solid aggregate to be separated or concentrated is placed. The lower part of the tank includes a lateral pistonlike device, generally driven by a motor, which produces the alternating motion of the piston. The impulse and suction movements of the liquid are designed to be propagated upward from the lower part of the tank to the upper part of the tank located below the grid, then vertically through the grid, thus making it possible to separate by density the desired product. After a period of operation, a concentration of dense products is obtained in the vicinity of the grid, with grains of lower density concentrated in layers above.

In some apparatus, the pistonlike control is effected by a simple lever, but whatever the means employed, the oscillations are transmitted laterally and then vertically. The concentration of heavy products taking place in the vicinity of the grid and the grains of lower density being separated out in the upper layers.

A common form of jig is known in the prior art that composes a liquid tank with a horizontal grid. The grid supporting a filter bed in some cases. The bottom of the liquid tank utilizes an oscillating surface comprising a cylinder with an appropriate flexible peripheral seal. The undulating motion of the cylinder conveying a vertical motion to the water or separating liquid causing it to produce a relatively uniform vertical flow through the grid and filter bed. The motion of the water lifts and separates the lighter products often causing them to overflow into a suitable discharge chute at the periphery of the tank. The central cylinder may assume various shapes but a preferred functional shape of a cone permits the heavier products to uniformly pass vertically downward through the grid, contact the incline surface of the cylinder and fall through the action of gravity to a central collection point permitting a convenient removal of the desired products. To take advantage of the entire area of the grid, the cylinder is generally as large as possible with the peripheral seal merely insuring a fluidtight tank. This form of jig creates a uniform vertical force of water often with a preferred movement of the surface liquid towards the peripheral discharge chute.

The prior art apparatus have generally been plagued with two problems: First, the need to empty the tank to recover the heavy products separated and, second, incomplete separation generally on the grid and in the refined product.

Recognizing the limitations of the prior art, the present invention seeks to improve the quality of the separation process by providing a preferred horizontal component in the jigging or separation motion of the liquid. By including this effective horizontal component to the normal vertical movement of the liquid, the present invention can in effect produce a twofold separation process for the same area and size of jig as the conventional apparatus. Both a vertical and horizontal separation process will be created since the peripheral heterogeneous mixture will be subject to not only the normal vertical separation but, under the influence of the horizontal component will force the refined product to undergo separation in the radial direction. The creation of this unique separating process permits the jig to incorporate numerous forms of grids to best utilize the advantages of this combined separating effect. For example, the mesh size can prohibit the passing of the dense separated products and still permit an effective accumulation of a refined product at a central portion of the mesh. Further, the mesh can be designed to permit the refined product to only pass at the center of the grid and thus provide a continual automatic separation process.

The object of the present invention is to provide an improved form of "jig" apparatus for density separation by liquid displacement where the above problems have been largely eliminated.

Accordingly, the apparatus of the present invention provides, in addition to the conventional components of a liquid tank and grid, the feature of a submerged diaphragm adapted for reciprocating movement and designed to encourage the formation of an effective horizontal component. The effectiveness of the horizontal component is further enhanced by setting the appropriate frequency of the undulating water and by the provision of baffles on the inner periphery of the tank walls.

Preferably, the horizontal component is in a radial direction, thus tending to separate the products according to their density into concentric vertical layers, the concentration and selection of the dense products being thus effected in a particular zone of the grid, defined by one of the vertical layers and preferably in the center of the sifter, the concentric strata being a result of the horizontal component while the vertical strata being the result of the conventional separation component.

The effect of a horizontal component can be obtained by any means that produces a displaced liquid having a local vertical thrust much stronger in one area than in any other portion of the liquid. This means may be, for example, an elastic diaphragm fixed around its periphery by attachment to the outer wall of the jig and subjected at its center to an upward and downward alternating thrust.

As a result of this central alternating thrust the liquid at the center of the elastic diaphragm decreases progressively from a maximum amplitude to a zero value at the periphery of the diaphragm which is effectively the junction of the wall and the diaphragm. This asymmetric action of the liquid creates reflection waves on the tank wall that produce the horizontal component. The effective value of this component will depend on a number of parameters, for example, the size and weight of the materials to be separated; the granularity of the material; the thickness of the filter bed; the level of the separating liquid in the tank; the amplitude of the diaphragm; the diameter of the tank, etc. By varying these factors, the appropriate effective horizontal component can be created in a given jig to create the combined separation or nonhomogeneous action of the liquid through the grid and filter bed. It has been discovered that it is expedient to vary the frequency of the diaphragm to achieve a more or less rapid and effective horizontal concentration of heavy products on the grid supporting the filter bed. In fact, actual experimentation has separated a diamond particle comprising one part in 100,000 of the heterogeneous crude material at the center of a grid.

In one embodiment of this invention the local concentration of heavy products is obtained in a specific zone of the grid, thus facilitating the removal of a pure product. This result is obtained by providing locally, at the places on the grid where the concentration is effected and only at these places, a grid mesh greater in dimension than the dimensions of the coarsest grain of the treated product. This permits the heavy products, separated from the other products by the double action of jigging, to pass through the grid at these places and to be recovered in the lower part of the tank. The remainder of the grid comprises a mesh of smaller dimension than that of the smallest grain of the treated product. The crude mixture is introduced to the tank and retained above that portion of the grid having a large mesh by a filter bed formed of grains or globules of larger dimension than those of the large mesh.

Another embodiment of the invention increases the local impelling force given to the jigging liquid and thereby increases the phenomena of double horizontal and vertical concentration by introducing baffle plates on the tank walls. The baffle plates have the form of peripheral crowns and are disposed on the wall portion between the sifter and the displaceable system forming part of the bottom of the apparatus and thus contributes to controlling the impulses of the liquid.

A feature of still another form of the invention is to simplify the supervision of the operation of the apparatus by using, for collecting heavy products, a reservoir tube of transparent material, thus making it possible to follow visually the accumulation of products while the apparatus is working.

A feature of still another form of the invention resides in a new combination of jigging driving members of a particularly lightweight and compact apparatus specially adapted to be used in a geological and mineral prospecting survey; these members being capable of being either driven by hand or driven by immediately interchangeable cams making it possible as desired to adapt the movement of jigging to the different nature of the products found.

The use of such an apparatus therefore not only permits direct recovery of heavy products which, after being separated by density and passing through the filter bed, then through meshes of larger size of the grid, pass through the opening in the pistonlike device to be collected in any desired apparatus, but also to collect products, the concentration of which is substantially 100 percent.

The immediate recovery of the treated products makes it possible to conveniently follow the process of selection and to check the grid employed, the properties of the filter bed, the rhythm of the pistonlike movement and the course of the pistonlike device.

It has been found helpful, especially with inexperienced labor, to provide a cam having a profile specially designed to produce a maximum concentration over a large range of frequencies. The cam activated to control the diaphragm movement. The rotation of the cam can be achieved by manually controlled mechanical means. To optimize the production rate a speed indicator can be incorporated which will measure the rotation speed of the cam. Various optimum frequencies can be empirically derived for the particular jig and material to be separated.

In order that the invention may readily be carried into practice, a number of embodiments will now be described in detail, by way of example, with reference to the accompanying drawings, in which.

Figure 1:
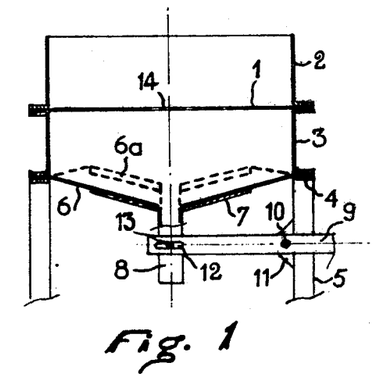
FIG. 1 is a schematic view in section of an apparatus according to the present invention.

One of the simplest embodiments of the apparatus forming the object of the invention is shown in FIG. 1. The apparatus comprises a fixed sifter 1 held on its periphery between two clamps formed by the edges of the members 2 and 3 or welded thereto. A crown 4, supported by the uprights 5, keeps the elastic diaphragm 6 in position, the edges of which cooperate to form a clamp between the members 3 and 4. An intermediate position of the diaphragm in the course of its displacement is indicated by 6a.

The diaphragm 6 is cemented, or secured, by any suitable means to a rigid partly conical member 7 comprising an opening 8 connected to a tube or any other reservoir, preferably transparent, acting as a container for the products separated by piston action. It is also possible to merely stretch diaphragm 6 between the walls of the tank without attaching the diaphragm to the conical member 7. This tube or reservoir carries a plugging device of any type, a simple emptying plug, for example, which is in a closed position during operation of the jig. The piston action is produced by means of the lever 9 pivoted at 10 on the member 11 of an upright 5, for example, and comprising at its end an opening 12 in which the nipple 13 engages, secured to the opening in the member. An alternating force is applied to the end of the lever 9 opposite the opening 12 to produce a corresponding vertical motion in the diaphragm. This force is transmitted to the diaphragm by the mechanical connection of the nipple 13 with lever 9 through an engagement in the opening 12.

Under the effect of alternating impulse and suction operations, creating the effective horizontal and vertical force components, the liquid used in the jig separates the products resting on the sifter 1 according to their density. As in the conventional apparatus, the heavy grains are separated in the lower portion and the light grains in the upper portion. However, owing to the geometry of the apparatus and particularly the conical form adopted by the elastic diaphragm in the course of its alternating motion in cooperation with the appropriate frequency, a jigging action is obtained having an effective horizontal component directed towards the axis of the apparatus. The conical shape helps produce a maximum impulse of liquid at the center while creating a minimal impulse at the tank walls. This radial component is experimentally demonstrated by an increase in the concentration of dense products which progressively mount up in the center of the sifter.

Figures 15, 20:
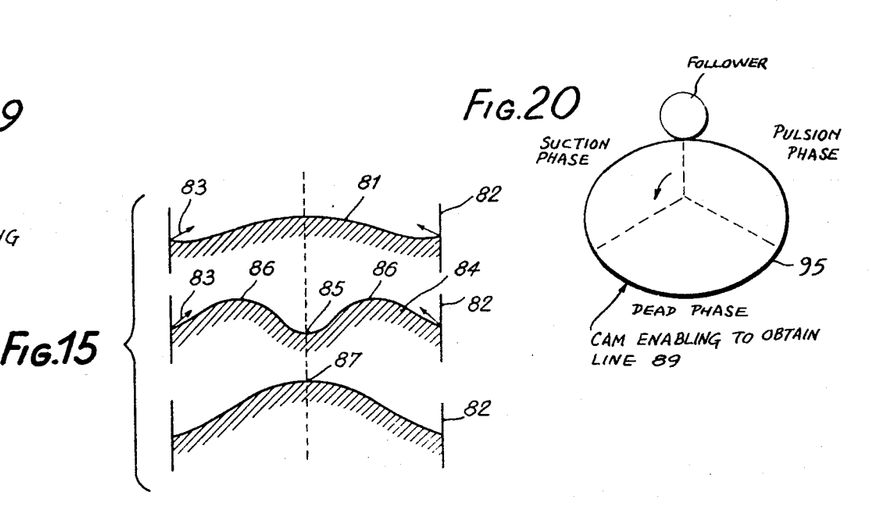
FIG. 15 is a schematic diagram of three vertical sections of the surface of the liquid during the first rotation of a cam controlling the diaphragm of the apparatus.
FIG. 20 is a plan view of the cam used to obtain line 88 of the diagram of FIG. 16.

Although a complete analysis of the horizontal separation process is difficult due to the numerous parameters involved, it is possible to achieve some understanding of the qualitative effects of the jigging action of the elastic diaphragm by reference to FIG. 15. Using a diaphragm whose central amplitude approaches 20 mm. produces a cross section of water disclosed by line 81, when the diaphragm is initially moved to its maximum amplitude. The peripheral portion of the diaphragm exerts a minimal influence on the liquid. Experience has disclosed that a number of cycles of the diaphragm may be necessary before the optimum jigging motion is produced. Generally, a cone diameter between 40 percent and 75 percent of the diameter of the tank has been highly successful. Viewing the liquid surface 81 it becomes obvious that without any further diaphragm movement the liquid will quickly reach equilibrium in a horizontal plane after several reflections from wall 82. Arrows 83 disclose the force component of the wall reflections. Cycling the downward motion of the diaphragm to optimize the horizontal effect as disclosed for liquid surface 84 will produce a central depression 85 as a result of the downward movement of the diaphragm with two reflection waves 86. The meeting of the reflection waves 86 coinciding with the upward displacement of the diaphragm produces the composite liquid surface 87 and completes the cycle.

The resulting concentration of heavy products in the center of the apparatus is helpful for the extraction of these products in a practically pure condition and can be accelerated by providing the center portion 14 of the sieve with meshes larger than those constituting the intermediate and peripheral zones of the sifter.

The very heavy concentration produced in the center of the sifter under the joint actions of the vertical and radial jigging components is then utilized to evacuate the heavy products by selecting, for the center part 14 of the sifter, meshes of a sufficiently large dimension. The heavy grains thus pass through the center portion of the sifter and flow out through the opening 8 into the container. However, the fine and light grains become heaped up on the intermediate and peripheral zone of the sifter, the meshes of which are small enough to retain them.

According to the invention a transparent plastic tube is preferably used as a container, making it possible to supervise the products obtained and the supply thereof. In this manner, it is possible to collect the heavy products as soon as they are selected by the apparatus.

Figure 2:
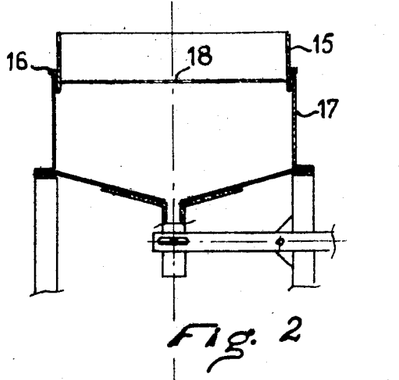
FIGS. 2 and 3 show schematically two variations of the apparatus shown in FIG. 1.

When it is desired to collect a certain quantity of heavy products, it is therefore necessary to recharge the apparatus after the exhaustion of the heavy products. In order to facilitate this operation, a variation has been constructed as shown in FIG. 2. In this embodiment, the member 2 is replaced by a removable sifter 15. This sifter may comprise flanges 16 resting on the member 17. In fact, 16 may be a crown comprising an elastic joint in order to avoid filtration of water or of liquid used. As in the preceding embodiment, the center portion 18 of the sifter is the only one having meshes wide enough to allow the passage of heavy products. As soon as an excessive reduction in the supply of heavy products is noted, or a total stoppage of the supply, it is only necessary to remove the sifter 15 and to recharge it to start again.

Figure 3:
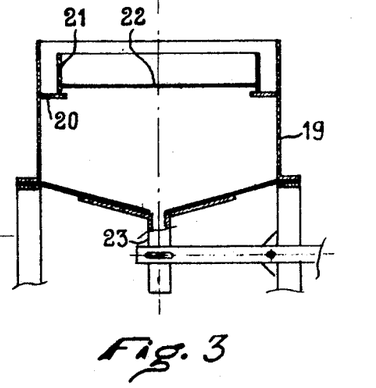

The apparatus shown in FIG. 3 is a variation of the one which has just been described. The member 17 is replaced by the member 19 with which a crown 20 is provided. A removable sifter 21, the center portion 22 of which always has meshes of larger dimension, plays the same part as the sifter 15. However, this apparatus has the advantage of avoiding any loss of liquid when the sifter is changed, the crown 20 also having a favorable effect on the concentration and regulation of the alternating flows of liquid.

Figures 13, 14:
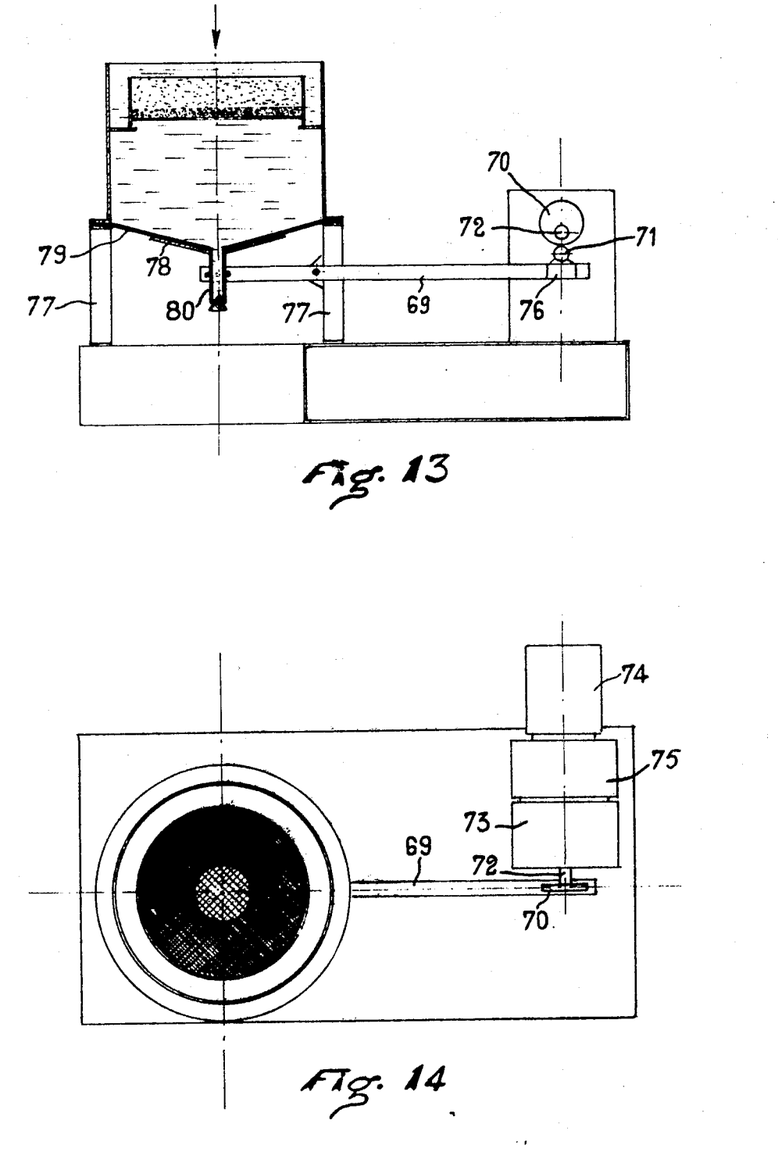
FIG. 13 is a schematic view in section of an apparatus, the mechanical control of which is adjustable.
FIG. 14 is a plan view of the apparatus shown in FIG. 13.
Figure 16:
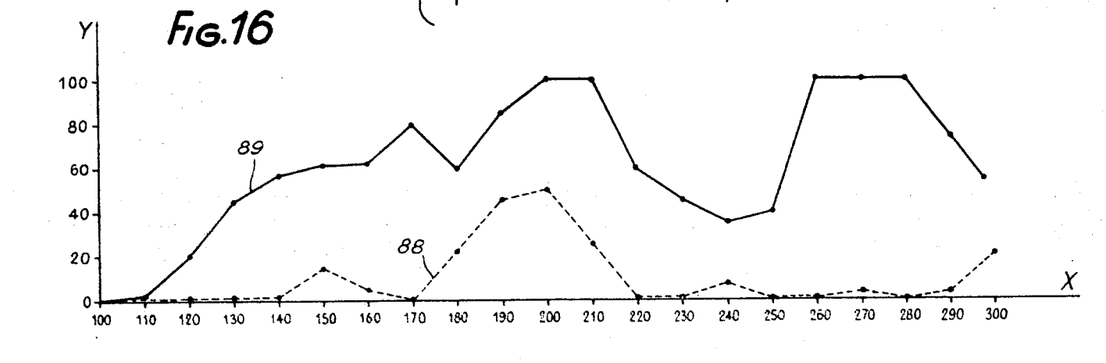
FIG. 16 is a diagram of the concentration rate versus the frequency for two different types of cams.
Figure 19:
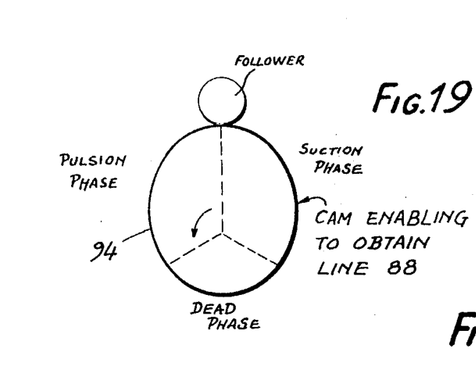
FIG. 19 is a plan view of the cam used to obtain line 89 of the diagram of FIG. 16.

The specific shape of the cam 70, FIG. 13, has significant effect on the concentration rate obtained in the jig. FIG. 16 discloses a comparison of concentration rates with the X-axis representing the number of cycles per minute while the Y-axis represents the concentration percentage. The diameter of the tank was 250 mm. with a 1 mm. sifter mesh. Line 88 represents the results using a cam 94 illustrated in FIG. 19. Line 89 represents the results using a cam 95 illustrated in FIG. 20. As can be seen from the chart, a complete separation was obtained using cam 95 with a frequency between 200 and 210 cycles per minute and also between 260 and 280 cycles per minute.

Figure 17:
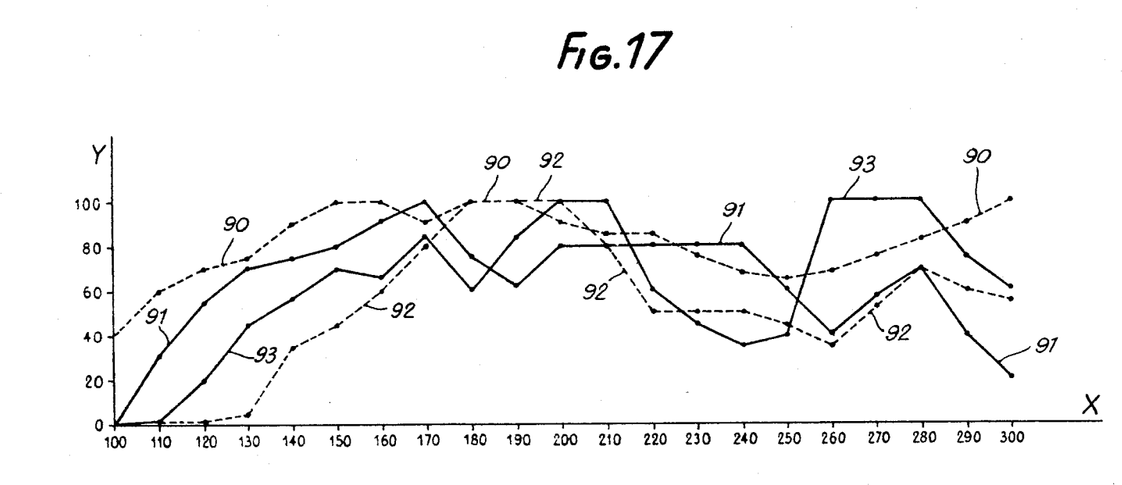
FIG. 17 is a diagram of the concentration rate versus the frequency for two different granulometries of the materials to be separated and for two different thicknesses of the filtering bed.

The incidence of frequency is also shown in FIG. 17 where the dotted line 90 corresponds to material to be separated having a granulometry comprised between 4 and 5 mm. while line 91 corresponds to a granulometry between 1 and 2.5 mm.

Line 92 corresponds to a jigging operation where the filtering bed is 60 mm. thick and line 93 represents a filter bed of 25 mm. The concentration rate is measured at the center of the grid.

Figure 18:
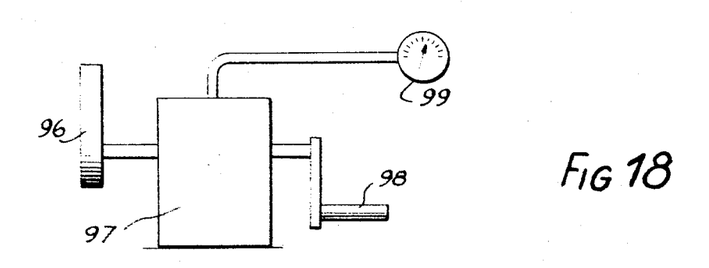
FIG. 18 is a diagrammatic view of a speed indicator connected to the cam.

As can be seen from the charts, the frequency of the jigging operation is an important parameter in creating an effective horizontal separation. One embodiment of the invention is disclosed in FIG. 18 where the cam 96 is controlled by the transmission 97. An input crank 98 can be operated by hand or machine (not shown) with the rotational speed computed on a speedometer 99. In the apparatus of FIGS. 13 and 14, the motor 74, the change speed gear 75 and the reduction gear 73 may be replaced, respectively by crank 98, transmission 97 and speed indicator 99.

Experiments have shown that the vertical amplitude of the diaphragm of a tank between 200 to 400 mm., may range between 5 mm. for a relatively fine material to 30 mm. for separating material having a granulometry larger than 5 mm. This amplitude may be easily adjusted by displacing the sleeve 76 supporting the roller 71 along the lever 69 together with the mechanism controlling the cam 70.

Figure 4:
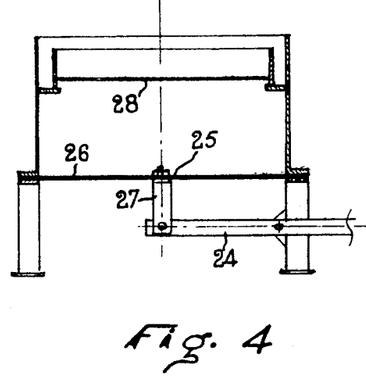
FIG. 4 is a schematic section of an apparatus corresponding to a particular case of the type shown in FIG. 3.

It is clear that the scope of the present invention would also include, for example, the omission of the opening 23 as shown in FIG. 4, since the process of the invention would still be used, consisting in providing a jigging arrangement having a horizontal component and selecting the products located in the zone of concentration in the center portion of the sifter in the embodiment selected. The horizontal component is produced by the water volume displaced during the vertical movement of the diaphragm. The resulting distribution of the high-density grains in an apparatus illustrated in FIG. 4 approximates the results obtained in the embodiments disclosed in FIGS. 1 through 3 because the diaphragm assumes during the portion of its cycles a form quite similar to those shown in FIGS. 2 and 3. In the apparatus shown, the lever 24 engages the center portion 25 of the diaphragm 26 by means of the link 27. As explained above, it would only be necessary to use the sifter 21, FIG. 3, to collect the desired products on the diaphragm. However, in order to avoid having to recover the products on the diaphragm, it is possible to use a removable sifter 28 having small uniform meshes. After the pistonlike action it is then only necessary to withdraw the sifter and to turn it over to disclose the accumulation of dense products on the center part of the filter cake.

Figure 5:
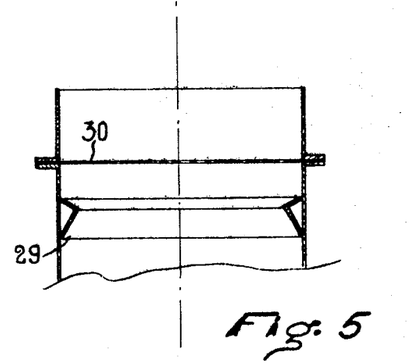
FIG. 5 is a section of a device according to the invention.

In order to increase the concentration of heavy products in the center part of the lower layers resting on the sifter, a baffle plate 29 is provided, shown, for example, in FIG. 5, disposed below the sifter 30. This baffle plate may also be fitted on an apparatus having a fixed sifter, as shown in the drawings, or any other apparatus having a removable sifter. The use of the baffle plate has the effect of regulating the waves produced by the reciprocating movement of the diaphragm and reducing the operating time thereof in order to obtain a good central concentration of heavy products.

Figure 6:
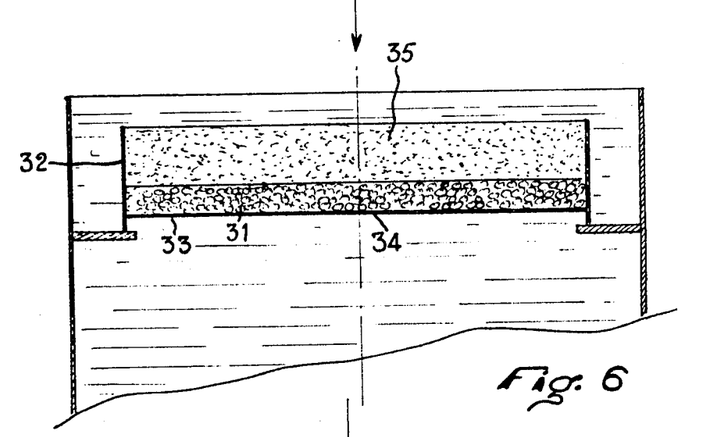
FIG. 6 is a detail shown in the form of a schematic section of an apparatus according to the invention comprising a filter bed.

The separation of the dense grains and light grains may be further improved by using a filter bed as shown at 31, FIG. 6. The filter bed is formed of grains, the smallest dimension of which is greater than the dimension of the meshes of the grid and the density of which is selected according to the density of the materials treated. As known in the filter bed art, the density of material 31 can be the same as the density of particles to be separated, but it must be of a higher density than the grains which are to be rejected in the jigging operation.

During an impulse, the filter bed removes from the meshes of the grid the low density grains of crude product, either by keeping these grains above the bed or by pushing them to the periphery. However, the heavy products drop through the bed and mesh.

This action helps favorably the local concentration, the grains of lower density being pushed towards the periphery of the sifter and arrested by the fine meshes provided in this region. On the other hand, the grains of higher density converge towards the wide meshes in the center of the sifter.

Thus, the base of the sifter 32 can be formed by a metal cloth 33 having small meshes, the dimensions of which are less than those of the fine grains whilst the center part 34 is shown with larger meshes in order to allow the dense grains which have passed through the filter bed to flow through immediately. The products 35 to be selected are poured over the filter bed. Under the effect of the jigging, the light grains thus accumulate in the upper part and partly on the periphery of the filter bed whilst the dense grains fall between the grains in the filter bed 31 and are concentrated in its center portion.

It is clear that the filter bed may be used in any embodiment of the apparatus and preferably with those comprising a removable sifter.

Figure 7:
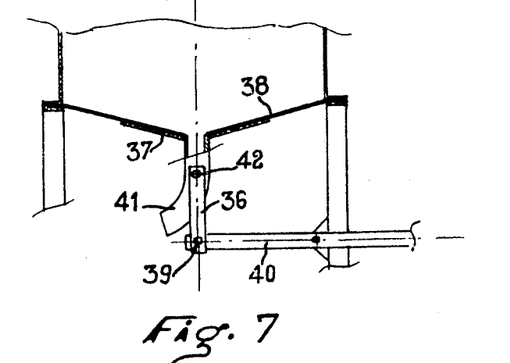
FIGS. 7, 8 and 9 show variations in the mounting of the device engaging the diaphragm.

The progress of the selected products towards the container and the control of the diaphragm may be obtained by very different means. For example, FIG. 7 shows a simple connecting rod 36 connecting the cylindrical part of the member 37 integral with the diaphragm 38 and the shaft 39 of the control lever 40. The preferably flexible and transparent tube 41 may be mounted by any suitable means on the cylindrical part of the member 37. The latter may comprise two spurs 42 supporting two connecting rods 36.

Figure 8:
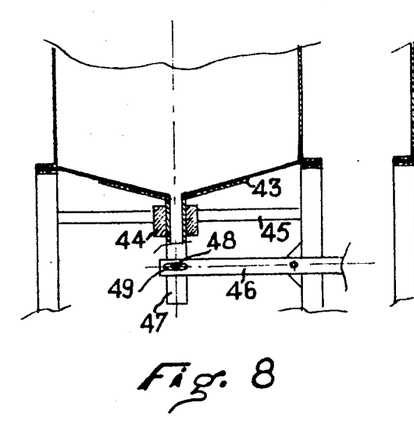

In the embodiment shown in FIG. 8, the cylindrical part of the member 43 is guided by a sleeve 44 supported by the crosspiece 45. The end of the lever 46 comprises a fork engaging the tube 47, the lugs 48 of which penetrate in the openings 49 provided on the lever.

In this manner, the diaphragm is always engaged in a strictly vertical direction, thus ensuring a more regular operation of the apparatus.

Figure 9:
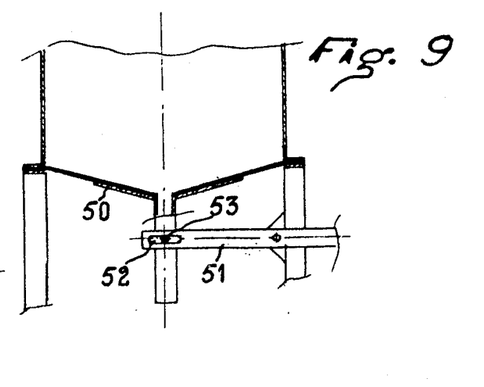

FIG. 9 shows a very simple embodiment in which the member 50 is engaged directly by the lever 51 at the end of which there are provided, as in the preceding case, openings 52 for receiving the lugs 53.

Such a method of control is particularly well adapted to a simple apparatus which is strong, compact and easily transportable as is necessary for prospecting surveys. An apparatus of this type is shown schematically in FIG. 10 in the condition it assumes in the course of transport. The operating lever 54 has been withdrawn from its operating position shown in dotted lines and is introduced into the hollow member 55 aligned with the holes 56 and 57 provided in the wall 58 of the apparatus. The member 55 may thus serve as a handle for transporting the apparatus which is thus suspended from the lever 54.

Figure 11:
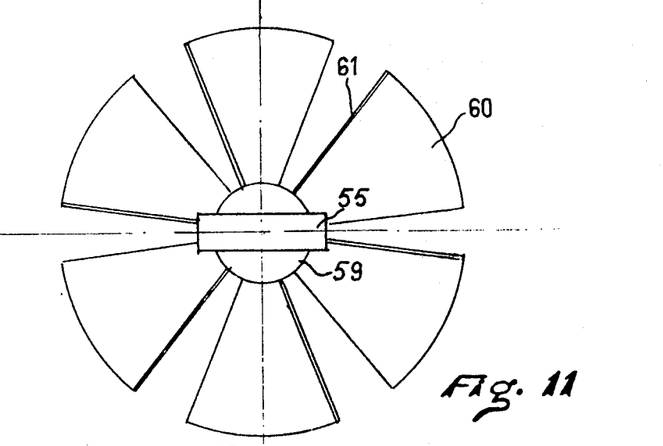
FIG. 11 is a plan view of an extractor used with the apparatus shown in FIG. 10.

The member 55 forms part of an assembly comprising a hollow cylinder 59 adjoining the inclined blades 60 shown more clearly in FIG. 11 and serving to extract the treated products. The extraction of the product is accomplished by applying the inclined blades 60 in a shovellike fashion against the filter bed surface in a clockwise direction. When the blades are covered by the treated products it is removed vertically from the filter bed. The blades 60 are edged with a vertical part 61 to facilitate the collection of the products.

Figure 12:
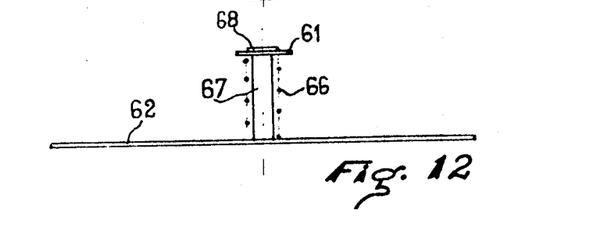
FIG. 12 is an elevation of the cover of the apparatus shown in FIG. 10.

During transport, the lower part 59 of the extractor (FIG. 10) bears on the crown 61 shown in FIG. 12 of the cover 62. This cover serves to keep the filter bed 63 locked between said cover and the metal cloth 64 of which only the center part 65 has wide meshes. As it rests on the crown 61, the member 59 (FIG. 10) compresses the spring 66 wound round its guide 67 (FIG. 12). The abutment 68 limits the movement of the crown 61.

Figure 10:
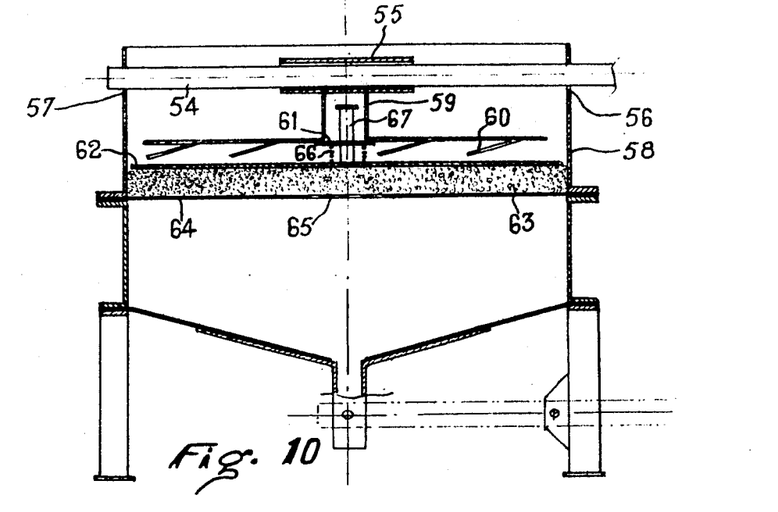
FIG. 10 is a schematic view in section of a portable apparatus according to the invention.

When it is desired to use the jig, it will be seen that it is only necessary to withdraw the lever 54 to place it in the dotted position shown in FIG. 10 and to clear the apparatus by means of the thus freed extractor after the withdrawal of the cover 62.

In the last embodiment shown in FIGS. 13 and 14, the lever 69 is controlled by an interchangeable cam 70 moving over the roller 71 located at the end of the lever. The cam is driven by the shaft 72 of the reduction gear 73 (FIG. 14) controlled by the motor 74 by way of a change speed gear 75.

Furthermore, the roller 71 is mounted on a displaceable sleeve 76 (FIG. 13) whilst the feet of the uprights 77 of the jig are guided in slides. In this manner it is possible to vary if desired, the course of the member 78 communicating the pistonlike movement to the diaphragm 79. Due to the provision of the evacuation tube shown diagrammatically at 80, it is easy to follow the results of the selection caused by the reciprocating movement, according to the various parameters concerned in the starting of the apparatus: speed of rotation of the cam, profile of the cam, motion of the diaphragm.

Although the drawings show only a few embodiments of the invention, it is clear that numerous additions, omissions or replacements for the various members constituting the new type of jig could be made to the embodiments illustrated without departing from the scope of the present invention. Therefore, in addition to the transparent containers for the permanent collection of the products, it would be possible in cases where the jig is used in a treatment factory for obtaining large supplies, to provide the upper part of the jig with a continuous feeding device, either by a hopper or by a flow of water, the discharge of the treated product being effected continuously on the opposing edges by the feeding effect itself. In the case of FIG. 13, for example, central feeding by a hopper and distributor or by a flow of water could be provided, the "-jigged" product overflowing and being collected in a reservoir or a peripheral evacuation duct, the assembly being capable of being completely automatic.

What I claim is:

1. Apparatus for particle separation according to density comprising:
   a. a container for holding the material to be separated;
   b. a grid forming the bottom of the container and comprising concentric mesh zones, the central zone having a coarser mesh than the remaining mesh zones of the grid;
   c. a liquid-containing tank operatively connected to the grid;
   d. a submerged diaphragm means for producing an effective horizontal force component in the liquid by the reciprocating action of the diaphragm in cooperation with the liquid in the tank;
   e. means to reciprocate the diaphragm; and
   f. means to discharge the particles separated by the horizontal force component.

2. Apparatus for particle separation according to claim 1 in which said remaining mesh zones comprise an intermediate zone and a peripheral zone; and a filter bed that covers the grid; the effective horizontal force separating the particles into concentric vertical layers according to their density.

3. Apparatus for particle separation according to claim 2 having at least one deflecting surface means on the periphery of the tank below the grid for increasing the displacement waves of the liquid; while the coarse mesh has a dimension greater than the largest particle to be separated and the intermediate and peripheral areas have a dimension smaller than the smallest particle to be separated.

4. Apparatus for particle separation according to claim 3 in which the width of the meshes in the center portion of the grid is greater than the largest dimension of the heavy grains to be separated, and the diaphragm means has an opening for the evacuation of the heavy grains, further including a transparent duct surrounding the opening to collect the heavy grains.

5. Apparatus for particle separation according to claim 3 in which the grid is removable and flat, a conical support member attached to the diaphragm, a lever operatively connected to the diaphragm and a removable motor driven cam that actuates the lever to produce a corresponding motion in the diaphragm.

6. Apparatus for particle separation according to claim 1 where the submerged diaphragm is elastic and the means to reciprocate the diaphragm includes a rigid conic member whose diameter is less than 75 percent of the tank diameter.

7. Apparatus for particle separation according to claim 1 where the means to reciprocate the diaphragm includes a removable cam having a profile camming surface designed to produce an effective horizontal force in the liquid.

8. Apparatus for particle separation according to claim 1 where the grid supports a filter bed.

9. Apparatus for particle separation according to claim 1 where the means to reciprocate the diaphragm includes a speedometer for determining when the effective horizontal force frequency range has been achieved and baffle means provided on the tank for increasing the horizontal force component.

10. Apparatus for particle separation comprising a tank, a grid within the tank and operatively connected to the tank, a base supporting the tank, an elastic diaphragm with a center opening, the peripheral portion of which is secured between the tank and the base, a partly conical rigid member covering the opening in the diaphragm, a removable lever fixed in the operating position to the conical member, means for removing separated particles, the apparatus also comprising for purposes of transport, a disc, a filter bed on the grid with the disc positioned on the filter bed, the disc being provided in its center portion with a shaft, a spring and a crown displaceable along the shaft, a member having impellers capable of removing the separated products and resting on the crown while being urged upward by the spring, the impeller member comprising in its upper portion a horizontal cylinder part serving to receive in the course of transport the center part of the removable lever, the ends of which are adapted to be connected to the tank.

11. A method for particle separation in a liquid according to density comprising:
  a. providing a container for holding the material to be separated, the material to be separated comprising relatively heavy and light particles,
  b. providing a separation surface permitting horizontal particle separation, the separation surface consisting of a grid forming the bottom of the container and having a mesh size which prevents the passage of the relatively heavy and relatively light particles,
  c. intermittently feeding the material to be separated onto the separation surface,
  d. filling a tank operatively connected to the grid with liquid,
  e. reciprocating a submerged diaphragm to produce both vertical and horizontal force components, the reciprocation of the diaphragm taking place in a frequency range wherein the horizontal force component is of such a degree that it provides an effective horizontal particle separation, the frequency range depending at least on the size and weight of material to be separated, the level of the liquid in the tank, the amplitude of the reciprocating diaphragm and the diameter of the tank,
  f. accumulating the relatively heavy particles in the center of the grid and the relatively light particles along the periphery of the grid, and
  g. removing the relatively heavy particles from the center of the grid and discharging the relatively light particles from the periphery of the grid.

12. A method for particle separation in a liquid according to density comprising:
  a. providing a container for holding the material to be separated, the material to be separated comprising relatively heavy and light particles,
  b. providing a grid forming the bottom of the container and having a mesh size which prevents the passage of the relatively heavy and relatively light particles,
  c. feeding the material to be separated onto the grid,
  d. filling a tank operatively connected to the grid with liquid,
  e. reciprocating a submerged diaphragm to produce both vertical and horizontal force components, the reciprocation of the diaphragm taking place in a frequency range wherein the horizontal force component is of such a degree that it provides an effective horizontal particle separation, the frequency range permitting the creation of central and conical waves of fluid which are reflected in a constructive manner from the tank,
  f. accumulating the relatively heavy particles in the center of the grid and the relatively light particles along the periphery of the grid, and
  g. removing the relatively heavy particles from the center of the grid and discharging the relatively light particles from the periphery of the grid.